(12) United States Patent
Patel et al.

(10) Patent No.: US 9,185,047 B2
(45) Date of Patent: Nov. 10, 2015

(54) HIERARCHICAL PROFILED SCHEDULING AND SHAPING

(71) Applicant: ALCATEL-LUCENT CANADA, INC., Ottawa (CA)

(72) Inventors: Nirmesh Patel, Kanata (CA); Joe Cote, Carleton Place (CA)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/183,646

(22) Filed: Feb. 19, 2014

(65) Prior Publication Data

US 2014/0169384 A1  Jun. 19, 2014

Related U.S. Application Data

(63) Continuation of application No. 13/096,479, filed on Apr. 28, 2011, now Pat. No. 8,693,489.

(51) Int. Cl.
*H04L 12/863* (2013.01)
*H04L 12/725* (2013.01)
(Continued)

(52) U.S. Cl.
CPC .......... *H04L 47/6215* (2013.01); *H04L 45/302* (2013.01); *H04L 45/60* (2013.01); *H04L 47/22* (2013.01); *H04L 47/60* (2013.01); *H04L 47/6275* (2013.01)

(58) Field of Classification Search
CPC . H04L 47/6215; H04L 47/6275; H04L 47/60; H04L 47/22; H04L 45/302; H04L 45/60
USPC .......................................................... 370/412
See application file for complete search history.

(56) References Cited

U.S. PATENT DOCUMENTS 6,519,595 B1   2/2003 Rose
7,826,358 B2   11/2010 Caram
(Continued)

FOREIGN PATENT DOCUMENTS

CA   2285243   10/1998
CA   2302129   9/2000
(Continued)

OTHER PUBLICATIONS

International Search Report for PCT/CA2012/050245 dated Apr. 28, 2011.
(Continued)

*Primary Examiner* — Mark Rinehart
*Assistant Examiner* — Gbemileke Onamuti
(74) *Attorney, Agent, or Firm* — Kramer & Amado, P.C.

(57) ABSTRACT

Various exemplary embodiments relate to a method and related network node including one or more of the following: determining, by the network node, that a port of the network node is ready to receive a packet; identifying a packet having a highest packet priority among a plurality of packets received via a plurality of interfaces, wherein the step of identifying includes, for each of a plurality of components at a first hierarchy level: identifying a first level highest priority packet among a plurality of packets available to the component, based on a packet priority associated with each of the plurality of packets available to the component, sharing the packet priority of the first level highest priority packet with at least one component at a second hierarchy level; and transmitting the packet having the highest priority to the port.

27 Claims, 5 Drawing Sheets

(51) Int. Cl.
*H04L 12/773* (2013.01)
*H04L 12/815* (2013.01)
*H04L 12/869* (2013.01)
*H04L 12/865* (2013.01)

(56) References Cited

U.S. PATENT DOCUMENTS

| | | |
|---|---|---|
| 8,259,738 B2 | 9/2012 | Sgouros et al. |
| 8,693,489 B2 * | 4/2014 | Patel et al. .................. 370/412 |
| 2002/0075884 A1 | 6/2002 | Wellen |
| 2002/0118683 A1 | 8/2002 | Narayana et al. |
| 2008/0215853 A1 | 9/2008 | Lane et al. |
| 2011/0051604 A1 | 3/2011 | Nishimura |

FOREIGN PATENT DOCUMENTS

| | | |
|---|---|---|
| CN | 1499787 A | 5/2004 |
| CN | 101478475 A | 8/2011 |
| JP | 2002217962 A | 12/2001 |
| JP | 2011049658 A | 3/2011 |

OTHER PUBLICATIONS

Korean Office Action dated Aug. 18, 2014 for Korean Application No. 2013-7028244.
Extended European Search Report for EP12777561 Dated Nov. 19, 2014.
First Office Action for Japanese Application No. 2014-506701 dated Dec. 22, 2014.

* cited by examiner

HIERARCHICAL PROFILED SCHEDULING AND SHAPING

RELATED APPLICATIONS

This is a continuation application of U.S. application Ser. No. 13/096,479, filed Apr. 28, 2011. The entire disclosure of the prior application is hereby incorporated by reference for all purposes as if fully set forth herein.

TECHNICAL FIELD

Various exemplary embodiments disclosed herein relate generally to network routing.

BACKGROUND

Many hierarchical telecommunications networks, including the Internet, are centered around a core network. Numerous smaller networks attach to the core network, thereby establishing communication with each other. To enable communication between such subnetworks and the core network, backhaul devices are provided to aggregate subnetwork traffic from various sources for transmission over the core network toward their respective destinations. As traffic exits the core network, similar backhaul devices sort and transmit packets toward the appropriate subnetworks for further routing.

Different traffic within such a telecommunications network often carries different priorities. For example, real-time video conferencing traffic may carry a higher priority than best-effort traffic such as web browsing. Various network devices may process packets differently depending on this associated priority. For example, given the simple choice between transmitting a real-time packet and a best-effort packet, a router may forward the real-time packet and either drop or delay the best-effort packet.

SUMMARY

Various exemplary embodiments relate to a method performed by a network node having a hierarchical organization for forwarding packets in a computer network, the method including one or more of the following: determining, by the network node, that a port of the network node is ready to receive a packet; identifying a packet having a highest packet priority among a plurality of packets received via a plurality of interfaces, wherein the step of identifying includes, for each of a plurality of components at a first hierarchy level: identifying a first level highest priority packet among a plurality of packets available to the component at the first hierarchy level, based on a packet priority associated with each of the plurality of packets available to the component at the first hierarchy level, sharing the packet priority of the first level highest priority packet with at least one component at a second hierarchy level; and transmitting the packet having the highest priority to the port.

Various exemplary embodiments relate to a network node for forwarding packets, the network node including one or more of the following: a transmission port for transmitting packets; a plurality of interfaces for receiving packets; a plurality of queues for storing packets received over the plurality of interfaces, wherein a packet priority is associated with each packet; and a plurality of first level shapers that are each associated with a subset of the plurality of queues, wherein each first level shaper: identifies a packet having a first level highest packet priority of all packets available for transmission from the subset of the plurality of queues, and shares the first level highest packet priority with at least one other component; a second level shaper that: receives an indication that the transmission port is ready to receive a packet, receives at least one first level highest packet priority shared by at least one of the plurality of first level shapers; identifies an available packet associated a highest packet priority based on the at least one first level highest packet priority, and transmits the available packet having the highest packet priority to the transmission port.

Various exemplary embodiments relate to a machine-readable storage medium encoded with instructions for execution by a network node having a hierarchical organization for forwarding packets in a computer network, the machine-readable storage medium including one or more of the following: instructions for determining, by the network node, that a port of the network node is ready to receive a packet; instructions for identifying a packet having a highest packet priority among a plurality of packets received via a plurality of interfaces, wherein the instructions for identifying include instructions for, for each of a plurality of components at a first hierarchy level: identifying a first level highest priority packet among a plurality of packets available to the component at the first hierarchy level, based on a packet priority associated with each of the plurality of packets available to the component at the first hierarchy level, sharing the packet priority of the first level highest priority packet with at least one component at a second hierarchy level; and instructions for transmitting the packet having the highest priority over the port.

Various exemplary embodiments relate to a method performed by a packet processor having a hierarchical organization for forwarding packets in a computer network, the method including one or more of the following: determining, by the packet processor, that the packet processor should transmit a packet; identifying a packet having a highest packet priority among a plurality of packets received from a plurality of sources, wherein the step of identifying includes, for each of a plurality of components at a first hierarchy level: identifying a first level highest priority packet among a plurality of packets available to the component at the first hierarchy level, based on a packet priority associated with each of the plurality of packets available to the component at the first hierarchy level, sharing the packet priority of the first level highest priority packet with at least one component at a second hierarchy level; and transmitting the packet having the highest priority.

Various exemplary embodiments relate to a packet processor for forwarding packets, the network node including one or more of the following: a plurality of queues for storing received packets, wherein a packet priority is associated with each packet; and a plurality of first level shapers that are each associated with a subset of the plurality of queues, wherein each first level shaper: identifies a packet having a first level highest packet priority of all packets available for transmission from the subset of the plurality of queues, and shares the first level highest packet priority with at least one other component; a second level shaper that: determines that the packet processor should transmit a packet, receives at least one first level highest packet priority shared by at least one of the plurality of first level shapers; identifies an available packet associated a highest packet priority based on the at least one first level highest packet priority, and transmits the available packet having the highest packet priority.

Various embodiments are described wherein a third hierarchy level is located between the first hierarchy level and the second hierarchy level.

Various embodiments are described wherein the plurality of packets is a group of all packets identified as eligible for transmission by at least a first plurality of traffic shaping components.

Various embodiments are described wherein each packet priority of the plurality of packets is determined based on at least one field carried by the packet.

Various embodiments are described wherein the plurality of packets are stored among a plurality of queues. Such embodiments may additionally include one or more of the following: determining a status for a queue holding a packet of the plurality of packets; determining a packet priority for the packet based on the status of the queue.

Various embodiments are described wherein the status is one of committed information rate status and excess information rate status.

Various embodiments additionally include one or more of the following: a third level shaper associated with at least one first level shaper; wherein the first level shaper shares the first level highest packet priority with at least one of the third level shaper and the second level shaper.

BRIEF DESCRIPTION OF THE DRAWINGS

In order to better understand various exemplary embodiments, reference is made to the accompanying drawings, wherein.

DETAILED DESCRIPTION

Aggregation in backhaul devices introduces difficulties in respecting packet priorities. For example, a backhaul device may implement a hierarchical system, wherein a component for each interface may be aware of the highest priority packet available. Next, a component for each physical card carrying a number of interfaces may be aware of a highest priority interface on a card. Finally, a component associated with the outgoing port may be aware of a highest priority card of all cards in the device. This method, however, may lead to many results wherein the highest priority packet across all interfaces must wait in queue for the transmission of lower priority packets such as, for example, low priority packets arriving via a higher priority interface or card. Accordingly, there is a need for a hierarchical scheduling device that truly schedules packets based on a packet priority.

Referring now to the drawings, in which like numerals refer to like components or steps, there are disclosed broad aspects of various exemplary embodiments.

Figure 1:
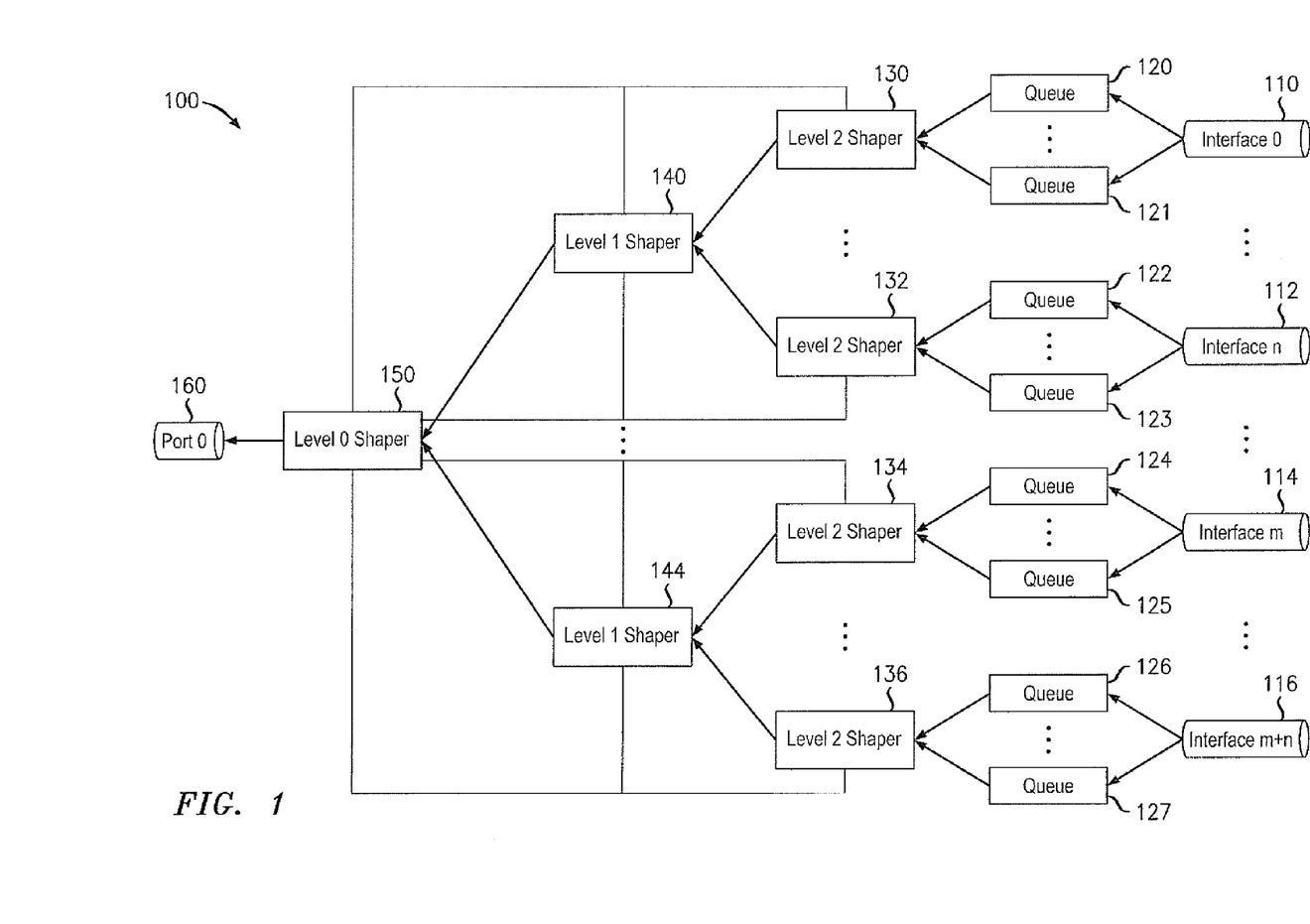
FIG. 1 illustrates an exemplary network node for forwarding packets from a plurality of interfaces.

FIG. 1 illustrates an exemplary network node 100 for forwarding packets from a plurality of interfaces. As illustrated, node 100 may have a hierarchical structure with three hierarchical levels. Node 100 may include a plurality of interfaces 110, 112, 114, 116; a plurality of queues 120, 121, 122, 123, 124, 125, 126, 127; a plurality of level 2 shapers 130, 132, 134, 136; a plurality of level 1 shapers 140, 144; level 0 shaper 150; and port 0 160. It will be appreciated that node 100 is in some respects a simplification and may include various additional components. For example, node 100 may include numerous additional ports (not shown). As another example, node 100 may include fewer or additional hierarchy levels. Various additional modifications will be apparent to those of skill in the art.

It should be apparent that various components of node 100 may be implemented as a single packet processor. For example, node 100 may include a packet processor (not detailed) that, in turn, includes plurality of queues 120, 121, 122, 123, 124, 125, 126, 127; plurality of level 2 shapers 130, 132, 134, 136; plurality of level 1 shapers 140, 144; and/or level 0 shaper 150 on a single chip or component.

Interfaces 110, 112, 114, 116 may each be an interface comprising hardware and/or executable instructions encoded on a machine-readable storage medium configured to receive messages from other nodes. For example, each interface 110, 112, 114, 116 may be an Ethernet port connecting to a different network node. It should be understood that two or more interfaces could connect to the same network node. Each interface 110, 112, 114, 116 may further be adapted to categorize received packets and store them in an appropriate queue accordingly.

Queues 120, 121, 122, 123, 124, 125, 126, 127 may each include hardware and/or executable instructions on a machine-readable storage medium configured to store various packets between time of receipt and transmission. For example, each queue 120, 121, 122, 123, 124, 125, 126, 127 may include a first-in-first-out (FIFO) buffer. Further, each queue 120, 121, 122, 123, 124, 125, 126, 127 may be associated with an interface 110, 112, 114, 116 and/or pre-configured quality of service (QoS) parameters. For example, queue 120 may be associated with guaranteed traffic received via interface 0 110 while queue 121 may be associated with best-effort traffic received via interface 0 110. Alternatively or additionally, each queue 120, 121, 122, 123, 124, 125, 126, 127 may be associated with a particular flow or group of flows received via the associated interface 110, 112, 114, 116.

During operation, each queue 120, 121, 122, 123, 124, 125, 126, 127 may operate under different status. For example, each queue 120, 121, 122, 123, 124, 125, 126, 127 may monitor the rate at which packets are transferred from the queue 120, 121, 122, 123, 124, 125, 126, 127 and determine whether the queue 120, 121, 122, 123, 124, 125, 126, 127 is currently operating in a committed information rate (CIR) status or an excess information rate (EIR) status. In this example, if the packets in queue 120 are transferred at a rate higher than its configured CIR over a recent time window, queue 120 may switch to EIR status to indicate that it is currently meeting its minimum throughput requirements and, accordingly, it may temporarily be treated as a lower priority.

Level 2 shapers 130, 132, 134, 136 may each include hardware and/or executable instructions on a machine-readable storage medium configured to determine which packet from the fronts of the associated queues 120, 121, 122, 123, 124, 125, 126, 127 has the highest packet priority. In doing so, level 2 shapers 130, 132, 134, 136 may take into account characteristics and/or a current status of the queue 120, 121, 122, 123, 124, 125, 126, 127. For example, level 2 shaper 130 may deem the packet at the front of queue 120 as the highest priority packet among the queues 120, 121 because queue 120 is associated with real-time traffic and currently in a committed information rate status. As another example, if queue 120 is instead in EIR status and queue 121 is in CIR status, level 2 shaper may instead deem a packet from queue 121 as having the highest packet priority, even though queue 121 stores best-effort traffic.

After determining the highest priority packet available, level 2 shapers 130, 132, 134, 136 may further indicate to other components the packet priority of the highest priority packets. For example, level 2 shaper 130 may determine that the packet at the front of queue 120 has the highest packet priority, which is "1." Level 2 shaper 130 may then indicate to level 1 shaper 140 and level 0 shaper 150 that its highest priority packet has a priority of "1." Level 1 shaper 140 and level 0 shaper 150 may then use this information to, in turn, determine the highest priority packet available to those components.

Level 2 shaper 130, 132, 134, 136 may perform additional functions such as, for example, packet transmission and rate shaping. Upon request from another component, such as level 1 shaper 140, 144, a level 2 shaper 130, 132, 134, 136 may transmit the packet having the highest priority from queue 120, 121, 122, 123, 124, 125, 126, 127. If more than one packet is associated with the highest priority packet, level 2 shaper 130, 132, 134, 136 may use some method for determining which of the packets to transmit such as, for example, the round robin algorithm. As level 2 shaper 130, 132, 134, 136 transmits packets, it may monitor the rate at which packets are being transmitted. If level 2 shaper 130, 132, 134, 136 determines that it is transmitting packets at a rate that is higher than a preconfigured maximum rate, level 2 shaper 130, 132, 134, 136 may indicate to at least one other component that it is temporarily ineligible to transmit a packet.

Level 1 shapers 140, 144 may each include hardware and/or executable instructions on a machine-readable storage medium configured to determine which associated level 2 shaper 130, 132, 134, 136 has access to the highest priority packet available to the level 1 shaper 140, 144. As previously described, each level 2 shaper 130, 132, 134, 136 may indicate the highest available packet priority to the associated level 1 shaper 140, 144. Level 1 shaper 140, 144 may use this information to determine the highest packet priority available to that component. For example, level 2 shaper 130 may indicate to level 1 shaper 140 that it has access to a packet of priority "1" while level 2 shaper 132 may indicate that it has access to a packet of priority "2." Accordingly, level 1 shaper 140 may determine that level 2 shaper 130 currently provides the highest priority packet.

Level 1 shapers 140, 144 may perform additional functions such as, for example, packet transmission and rate shaping. Upon request from another component, such as level 0 shaper 150, a level 1 shaper 140, 144 may request the packet having the highest priority from level 2 shaper 130, 132, 134, 136. If more than one packet is associated with the highest priority packet, level 1 shaper 140, 144 may use some method for determining which of the packets to transmit such as, for example, the round robin algorithm. As level 1 shaper 140, 144 transmits packets, it may monitor the rate at which packets are being transmitted. If l level 1 shaper 140, 144 determines that it is transmitting packets at too high a rate, level 1 shaper 140, 144 may indicate to at least one other component that it is temporarily ineligible to transmit a packet.

Level 0 shaper 150 may include hardware and/or executable instructions on a machine-readable storage medium configured to determine which associated level 1 shaper 140, 144 has access to the highest priority packet available to the level 0 shaper 150. As previously described, each level 2 shaper 130, 132, 134, 136 may indicate the highest available packet priority to the associated level 0 shaper 150. Level 0 shaper 150 may use this information to determine the highest packet priority available to that component. For example, level 2 shaper 130 may indicate to level 0 shaper 140 that it has access to a packet of priority "1;" level 2 shaper 132 may indicate that it has access to a packet of priority "2;" level 2 shaper 134 may indicate that it has access to a packet of priority "3;" and level 2 shaper 136 may indicate that it has access to a packet of priority "2." Accordingly, level 0 shaper 150 may determine that level 2 shaper 130, and consequently level 1 shaper 140, currently provides the highest priority packet.

Level 0 shaper 150 may provide additional functions such as port monitoring and packet transmission. Level 0 shaper 150 may monitor port 160 to determine when port 0 160 is ready to transmit the next packet. For example, port 0 160 may transmit a signal to level 0 shaper 150 or level 0 shaper 150 may monitor the fill level of an outgoing queue of port 0 160. Regardless of the method used, once level 0 shaper 150 determines that port 0 160 is ready for the next packet, it may transmit a request for a packet to the level 1 shaper 140, 144 that has access to the highest priority packet. In the case where multiple level 2 shapers 140, 144 have access to a packet of highest priority, level 0 shaper 150 may use some method for determining which of the packets to transmit such as, for example, the round robin algorithm.

Port 0 160 may be an interface comprising hardware and/or executable instructions encoded on a machine-readable storage medium configured to transmit messages to other nodes. For example, port 0 may be an Ethernet port connecting to a different network node such as, for example, a core network device.

Having described the components of network node 100, a brief summary of the operation of network node 100 will be provided. It should be apparent that the following description is intended to provide an overview of the operation of network node 100 and is therefore a simplification in some respects. The detailed operation of network node 100 will be described in further detail below in connection with FIGS. 2-7. Note that while the following example assumes the presence of only those components illustrates in FIG. 1, additional and/or duplicate components may be included in a network node.

Level 2 shaper 130 may presently indicate to level 1 shaper 140 and level 0 shaper 150 that its highest priority packet has a priority of "1." Likewise, level 2 shapers 132, 134, 136 may indicate that their highest priority packets carry priorities of "2," "3," and "2," respectively. When level 0 shaper 150 determines that port 0 160 is ready for another packet, level 0 shaper 150 may request a packet from level 1 shaper 140, because it offers the highest priority packet. Level 1 shaper 140, in turn, may request a packet from level 2 shaper 130 because level 2 shaper 130 offers the highest priority packet. Level 2 shaper may dequeue the packet from queue 120 and transmit the packet to level 1 shaper 140 which, in turn, transmits the packet to level 0 shaper 150. Level 0 shaper 150 then transmits the packet to port 0 160.

After transmitting a packet, level 2 shaper 130 may determine that its new highest priority packet has a priority of "2." Level 2 shaper 130 may further determine that it is currently exceeding its maximum rate and may indicate to level 1 shaper 140 and/or level 0 shaper 150 that it is currently ineligible to transmit a packet. Accordingly, for the next packet, level 0 shaper 150 may use round robin to determine whether to transmit the packet offered by level 2 shaper 132 or the packet offered by level 2 shaper 136, because both packets carry the highest available priority of "2."

Figure 2:
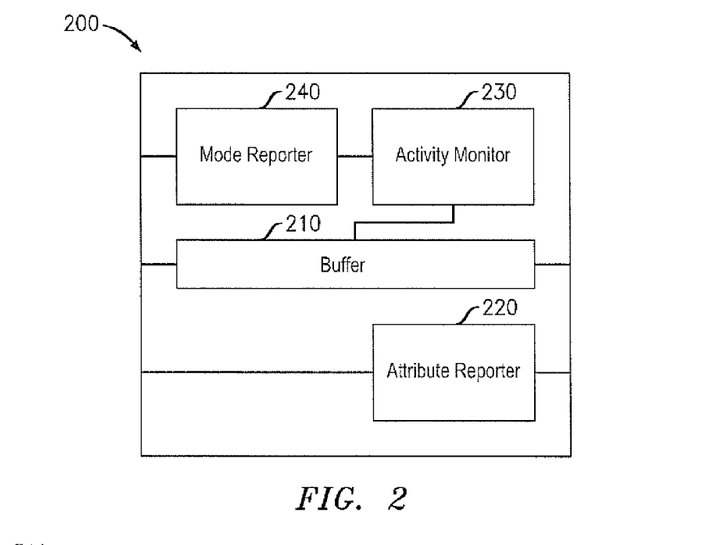
FIG. 2 illustrates an exemplary queue for storing packets.

FIG. 2 illustrates an exemplary queue 200 for storing packets. Queue 200 may correspond to one or more of queues 120, 121, 122, 123, 124, 125, 126, 127. Queue 200 may include a buffer 210, attribute reporter 220, activity monitor 230, and status reporter 240.

Buffer 210 may be any machine-readable medium capable of storing packets. Accordingly, buffer may include a machine-readable storage medium such as random-access memory (RAM), magnetic disk storage media, optical storage media, flash-memory devices, and/or similar storage media. Buffer 210 may store incoming packets and transmit packets in a first-in-first-out (FIFO) order. Such incoming packets may arrive via an interface, such as one or more of interfaces 110, 112, 114, 116.

Attribute reporter 220 may include hardware and/or executable instructions on a machine-readable storage medium configured to store configuration information regarding the type of packets to be stored in queue 200. Attribute reporter 220 may further be configured to report such configuration information to other components such as, for example, one or more of interfaces 110, 112, 114, 116, and/or one or more of level 2 shapers 130, 132, 134, 136. For example, attribute reporter 220 may indicate that packets having a class of service (CoS) tag of "6" or "7" should be stored in queue 200. It should be apparent that other attributes may be used other than CoS to determine which packets should be stored in queue 200. Alternatively or additionally, attribute reporter 220 may indicate particular flows which should be stored in queue 200. Attribute reporter 220 may be preconfigured and/or configured during runtime.

Activity monitor 230 may include hardware and/or executable instructions on a machine-readable storage medium configured to monitor buffer 210 and estimate or otherwise determine a current output rate of packets from buffer 210. For example, activity monitor 230 may maintain a counter that is incremented each time a packet is transmitted from buffer 210. This counter may be reduced or cleared periodically, such that it serves as an estimate of the current transmission rate for queue 200. Other methods of estimating or determining a current activity rate for queue 200 will be apparent to those of skill in the art.

Status reporter 240 may include hardware and/or executable instructions on a machine-readable storage medium configured to determine a current status for queue 200. For example, in various embodiments, queue 200 may operate in CIR or EIR status. Using the current activity level determined by activity monitor 230, status reporter may determine which under status queue 200 is currently operating. For example, if the current activity is greater than a predetermined threshold, status reporter 240 may indicate to other components that queue 200 is currently in EIR status. Otherwise, status reporter 240 may indicate to other components that queue 200 is currently in CIR status. Status reporter 240 may report this status information to one or more other components such as, for example, one or more of level 2 shapers 130, 132, 134, 136.

Figure 3:
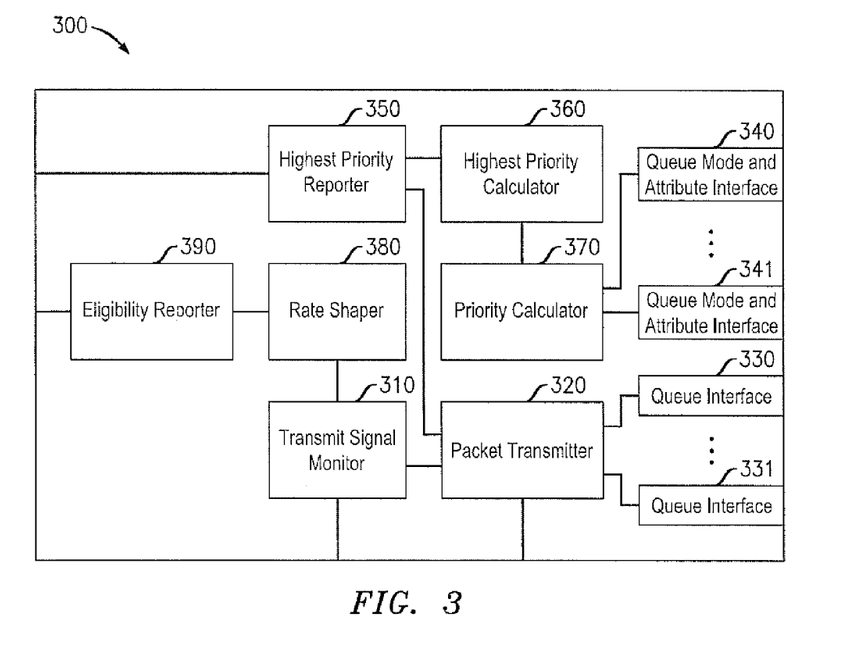
FIG. 3 illustrates an exemplary level 2 shaper for transmitting packets.

FIG. 3 illustrates an exemplary level 2 shaper 300 for transmitting packets. Level 2 shaper 300 may correspond to one or more of level 2 shapers 130, 132, 134, 136. Level 2 shaper 300 may include transmit signal monitor 310, packet transmitter 320, queue interfaces 330, 331, queue status and attribute interfaces 340, 341, highest priority reporter 350, highest priority calculator 360, priority calculator 370, rate shaper 380, and eligibility reporter 390.

Transmit signal monitor 310 may include hardware and/or executable instructions on a machine-readable storage medium configured to receive a signal from another component indicating a request to transmit a packet. For example, one or more of level 1 shapers 140, 144 may send a signal to transmit signal monitor 310 requesting transmission of a packet. In response, transmit signal monitor 310 may instruct packet transmitter 320 to transmit a packet. Transmit signal monitor 310 may also inform rate shaper 380 that a packet has been transmitted.

Packet transmitter 320 may include hardware and/or executable instructions on a machine-readable storage medium configured to request and receive a packet via one or more of queue interfaces 330, 331. Upon receiving a requested packet, packet transmitter 320 may forward the packet to the requesting component such as, for example, one or more of level 1 shapers 140, 144. Upon receiving an indication from transmit signal monitor 310 that a packet should be transmitted, packet transmitter 320 may determine which queue holds the highest priority packet. For example, as will be described in further detail with respect to highest priority reporter 350, highest priority reporter 350 may indicate one or more of queue interfaces 330, 331 from which packet transmitter 320 may obtain a packet carrying the highest available priority. If more than one of interfaces 330, 331 may provide a highest priority packet, packet transmitter 320 may use some method, such as round robin, to select a queue interface 330, 331 from which to request a packet.

Queue interfaces 330, 331 may each include hardware and/or executable instructions on a machine-readable storage medium configured to communicate with queues such as, for example, one or more of queues 120, 121, 122, 123, 124, 125, 126, 127. Accordingly, queue interfaces 330, 331 may be operable to transmit requests for packets and/or receive packet data in response.

Queue status and attribute interfaces 340, 341 may each include hardware and/or executable instructions on a machine-readable storage medium configured to communicate with queues such as, for example, one or more of queues 120, 121, 122, 123, 124, 125, 126, 127. Accordingly, queue interfaces 330, 331 may be operable to transmit requests for data and/or receive status and/or queue attribute information.

Highest priority reporter 350 may include hardware and/or executable instructions on a machine-readable storage medium configured to transmit a signal to one or more components indicating the highest priority among the packets available to shaper 300. For example, highest priority reporter may send the highest priority value to one or more of level 1 shapers 140, 144, and/or level 0 shaper 150. Highest priority reporter 350 may have knowledge of the highest priority available from highest priority calculator. Highest priority reporter may additionally indicate to packet transmitter 320 which interfaces and/or queues currently offer a packet associated with the highest priority.

Highest priority calculator 360 may include hardware and/or executable instructions on a machine-readable storage medium configured to determine the highest priority among all packets currently available from a queue associated with shaper 300. Highest priority calculator 360 may receive a current priority for each queue from priority calculator 370 and identify the highest value of the priorities reported. Highest priority calculator 360 may further be adapted to indicate which queues currently offer a packet having the highest priority to highest priority reporter 350 and/or packet transmitter 320.

Priority calculator 370 may include hardware and/or executable instructions on a machine-readable storage medium configured to determine, for each queue associated with shaper 300, the priority of the currently offered packet. For example, in an embodiment wherein each queue is configured to correspond to a CoS and reports one of a CIR and an EIR status, priority calculator 370 may retrieve this information via one or more of queue status and attribute interfaces 340, 341. Priority calculator 370 may then use the status and attribute information to determine a current priority for the queue. In various embodiments, priority calculator 370 may assign one of four priorities to a queue. For example, priority calculator 370 may determine that a queue associated with a CoS of "5" or higher and operating in CIR status has a current priority of "1;" a queue associated with a CoS of "4" or lower and operating in CIR status has a current priority of "2;" a queue associated with a CoS of "5" or higher and operating in EIR status has a current priority of "3;" and a queue associated with a CoS of "4" or lower and operating in EIR status has a current priority of "4." It should be apparent that a number of different methods to assign priority may be used and that additional or alternative information may be used in determining a priority value. Further, greater or fewer than four priority levels may be assigned.

Rate shaper 380 may include hardware and/or executable instructions on a machine-readable storage medium configured to monitor and/or estimate a current rate of transmission for shaper 300. For example, rate shaper 380 may include a counter that is incremented each time transmit signal monitor 310 indicates that a packet is being transmitted. Rate shaper 380 may periodically decrease or reset this counter in order to maintain a current estimation of the transmission rate. Other methods for determining or estimating a recent transmission rate will be apparent to those of skill in the art. Rate shaper 380 may further be configured with a threshold for rate shaping. For example, if the current transmission rate exceeds the configured threshold (such as, for example, 1 mbps), rate shaper 380 may indicate to eligibility reporter 390 that packet transmission should be temporarily halted.

Eligibility reporter 390 may include hardware and/or executable instructions on a machine-readable storage medium configured to indicate to one or more other components whether shaper 300 is currently eligible to transmit a packet. For example, eligibility reporter 390 may communicate this information to one or more of level 1 shapers 140, 144, and/or level 0 shaper 150.

In various alternative embodiments, eligibility and highest available priority may not be separately reported. For example, if shaper 300 determines that it is currently ineligible to transmit a packet, shaper 300 may simply indicate the lowest possible priority as the highest available priority packet to discourage requests for packet transmission. In such embodiments, highest priority reporter 350 and eligibility reporter 390 may be the same component. Various additional modifications will be apparent to those of skill in the art.

Figure 4:
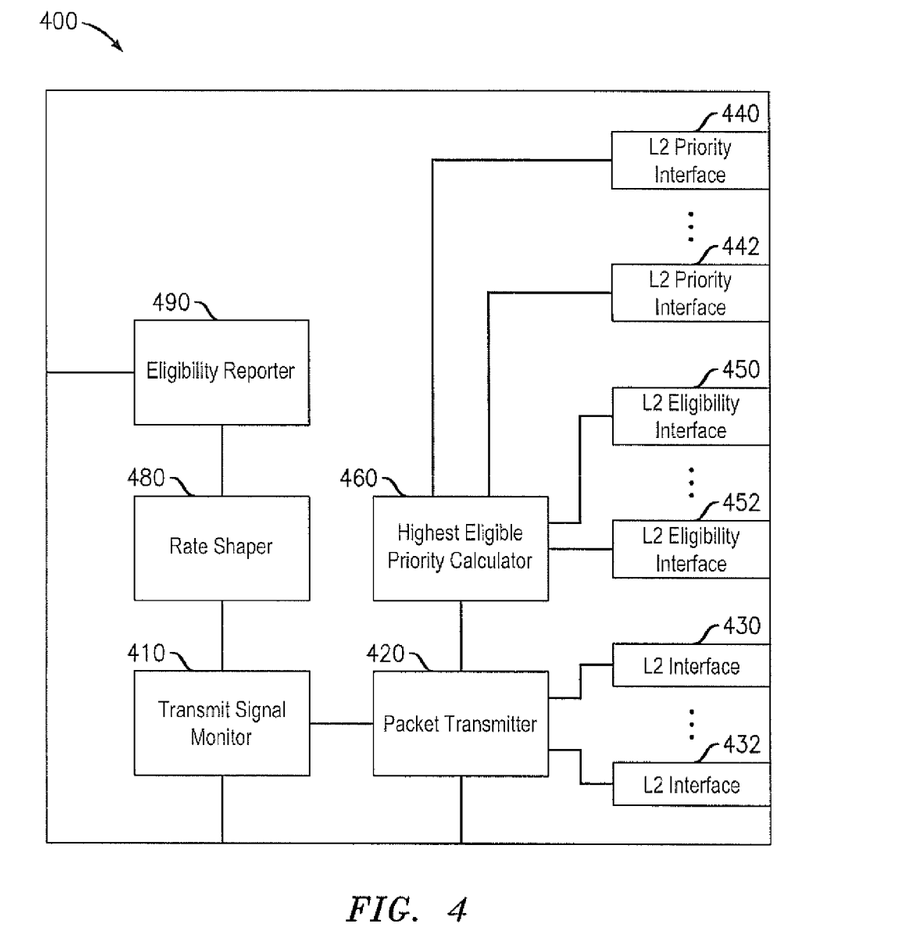
FIG. 4 illustrates an exemplary level 1 shaper for transmitting packets.

FIG. 4 illustrates an exemplary level 1 shaper 400 for transmitting packets. Level 1 shaper 400 may correspond to one or more of level 1 shapers 140, 144. Level 1 shaper 400 may include transmit signal monitor 410, packet transmitter 420, L2 interfaces 430, 432, L2 priority interfaces 440, 442, L2 eligibility interfaces 450, 452 highest eligible priority calculator 460, rate shaper 480, and eligibility reporter 490.

Transmit signal monitor 410 may include hardware and/or executable instructions on a machine-readable storage medium configured to receive a signal from another component indicating a request to transmit a packet. For example, level 0 shapers 150 may send a signal to transmit signal monitor 410 requesting transmission of a packet. In response, transmit signal monitor 410 may instruct packet transmitter 420 to transmit a packet. Transmit signal monitor 410 may also inform rate shaper 480 that a packet has been transmitted.

Packet transmitter 420 may include hardware and/or executable instructions on a machine-readable storage medium configured to request and receive a packet via one or more of L2 interfaces 430, 432. Upon receiving a requested packet, packet transmitter 420 may forward the packet to the requesting component such as, for example, level 0 shapers 150. Upon receiving an indication from transmit signal monitor 410 that a packet should be transmitted, packet transmitter 420 may determine which L2 shaper offers the highest priority packet. For example, as will be described in further detail with respect to highest eligible priority calculator 460, highest eligible priority calculator 460 may indicate one or more of L2 interfaces 430, 432 from which packet transmitter 420 may obtain a packet carrying the highest available priority. If more than one of L2 interfaces 430, 432 may provide a highest priority packet, packet transmitter 420 may use some method, such as round robin, to select a L2 interface 430, 432 from which to request a packet.

L2 interfaces 430, 432 may each include hardware and/or executable instructions on a machine-readable storage medium configured to communicate with L2 components such as, for example, one or more of L2 shapers 130, 132, 134, 136. Accordingly, L2 interfaces 430, 432 may be operable to transmit requests for packets and/or receive packet data in response.

L2 priority interfaces 440, 442 may each include hardware and/or executable instructions on a machine-readable storage medium configured to communicate with L2 components such as, for example, one or more of L2 shapers 130, 132, 134, 136. Accordingly, L2 priority interfaces 440, 442 may be operable to receive a highest available priority value from each such L2 component. Such highest available priority may be transmitted, for example, by a component such as highest priority reporter 350 of shaper 300.

L2 eligibility interfaces 450, 452 may each include hardware and/or executable instructions on a machine-readable storage medium configured to communicate with L2 components such as, for example, one or more of L2 shapers 130, 132, 134, 136. Accordingly, L2 eligibility interfaces 450, 452 may be operable to receive an indication from each such L2 component as to whether the L2 component is currently eligible to transmit a packet. Such indication may be transmitted, for example, by a component such as eligibility reporter 390 of shaper 300.

Highest eligible priority calculator 460 may include hardware and/or executable instructions on a machine-readable storage medium configured to determine which L2 components currently offer a packet with the highest priority. Accordingly, for each L2 component associated with shaper 400, highest eligible priority calculator 460 may retrieve priority information via L2 priority interfaces 440, 442 and eligibility information via L2 eligibility interfaces 450, 452. Highest eligible priority calculator 460 may then determine, for those associated L2 devices currently eligible to transmit a packet, the highest priority packet available. Highest eligible priority calculator 460 may then indicate to packet transmitter 420 which L2 components offer a packet having the highest eligible priority. In various alternative embodiments wherein eligibility is not separately reported, highest eligible priority calculator 460 may simply determine the highest reported priority and L2 eligibility interfaces 450, 452 may not be present.

Rate shaper 480 may include hardware and/or executable instructions on a machine-readable storage medium configured to monitor and/or estimate a current rate of transmission for shaper 400. For example, rate shaper 480 may include a counter that is incremented each time transmit signal monitor 410 indicates that a packet is being transmitted. Rate shaper 480 may periodically decrease or reset this counter in order to maintain a current estimation of the transmission rate. Other methods for determining or estimating a recent transmission rate will be apparent to those of skill in the art. Rate shaper 480 may further be configured with a threshold for rate shaping. For example, if the current transmission rate exceeds the configured threshold (such as, for example, 1 mbps), rate shaper 480 may indicate to eligibility reporter 490 that packet transmission should be temporarily halted.

Eligibility reporter 490 may include hardware and/or executable instructions on a machine-readable storage medium configured to indicate to one or more other components whether shaper 400 is currently eligible to transmit a packet. For example, eligibility reporter 490 may communicate this information to level 0 shaper 150.

In various alternative embodiments wherein the level 2 shapers provide an available highest priority to level 1 shapers but not level 0 shapers, level 1 shaper 400 may additionally include a highest priority reporter (not shown), similar to highest priority reporter 350 of level 2 shaper 300. As such, each level 1 shaper may report the highest priority available to that component. The provided L0 shaper may then receive a smaller number of such highest available priorities. Additional modifications useful in implementing such alternative embodiments will be apparent to those of skill in the art.

Figure 5:
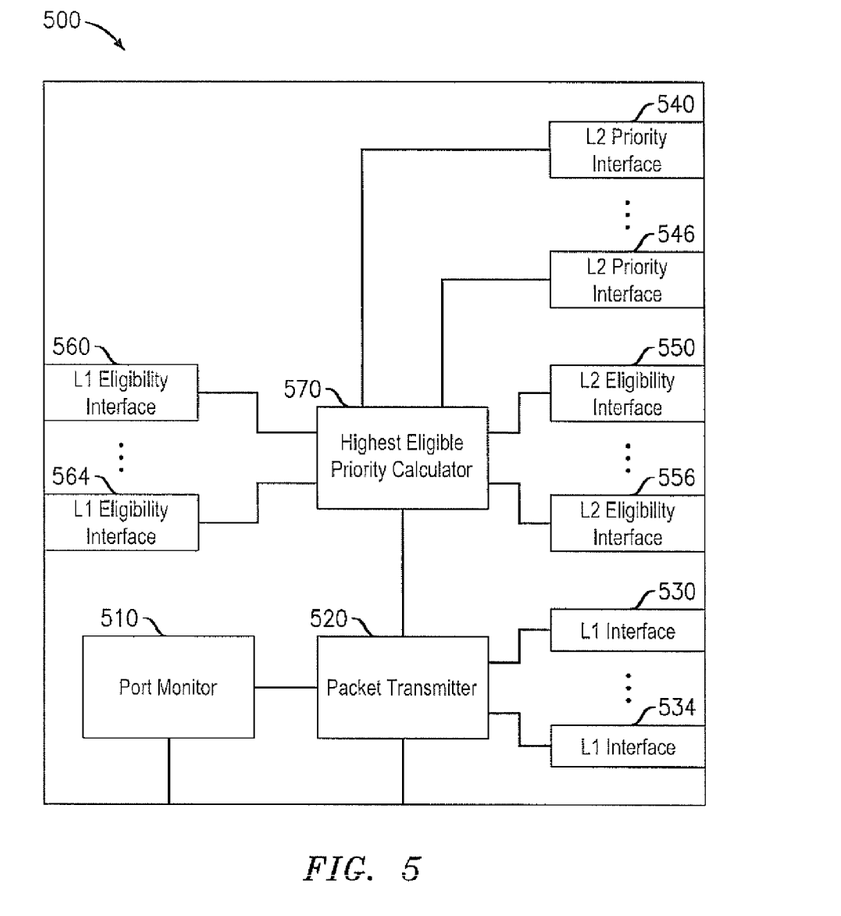
FIG. 5 illustrates an exemplary level 0 shaper for transmitting packets.

FIG. 5 illustrates an exemplary level 0 shaper 500 for transmitting packets. Level 0 shaper 500 may correspond to level 0 shaper 150. Level 0 shaper 500 may include port monitor 510, packet transmitter 520, L1 interfaces 530, 534, L2 priority interfaces 540, 546, L2 eligibility interfaces 550, 556, L1 eligibility interfaces 560, 564, and highest eligible priority calculator 570.

Port monitor 510 may include hardware and/or executable instructions on a machine-readable storage medium configured to monitor a port, such as port 0 160, and/or receive a signal from such a port indicating that the port is ready to receive a packet. In response, port monitor 510 may instruct packet transmitter 520 to transmit a packet.

Packet transmitter 520 may include hardware and/or executable instructions on a machine-readable storage medium configured to request and receive a packet via one or more of L1 interfaces 530, 534. Upon receiving a requested packet, packet transmitter 520 may forward the packet to the ready port such as, for example, port 0 160. Upon receiving an indication from port monitor 510 that a packet should be transmitted, packet transmitter 520 may determine which L1 component currently offers the highest priority packet. For example, as will be described in further detail with respect to highest eligible priority calculator 570, highest eligible priority calculator 570 may indicate one or more of L1 interfaces 530, 534 from which packet transmitter 520 may obtain a packet carrying the highest available priority. If more than one of interfaces 530, 534 may provide a highest priority packet, packet transmitter 520 may use some method, such as round robin, to select a queue interface 530, 534 from which to request a packet.

L1 interfaces 530, 534 may each include hardware and/or executable instructions on a machine-readable storage medium configured to communicate with L1 components such as, for example, one or more of L1 shapers 140, 144. Accordingly, L1 interfaces 530, 534 may be operable to transmit requests for packets and/or receive packet data in response.

L2 priority interfaces 540, 546 may each include hardware and/or executable instructions on a machine-readable storage medium configured to communicate with L2 components such as, for example, one or more of L2 shapers 130, 132, 134, 136. Accordingly, L2 priority interfaces 540, 546 may be operable to receive a highest available priority value from each such L2 component. Such highest available priority may be transmitted, for example, by a component such as highest priority reporter 350 of shaper 300.

In various alternative embodiments wherein the level 2 shapers provide an available highest priority to level 1 shapers but not level 0 shapers, level 1 shapers may report their highest priorities to the level 0 shapers. In such embodiments, level 0 shaper 500 may alternatively or additionally include a number of L1 priority interfaces (not shown) that operate in a similar manner to L2 priority interfaces, instead communicating with a number of L1 components. Additional modifications useful in implementing such alternative embodiments will be apparent to those of skill in the art.

L2 eligibility interfaces 550, 556 may each include hardware and/or executable instructions on a machine-readable storage medium configured to communicate with L2 components such as, for example, one or more of L2 shapers 130, 132, 134, 136. Accordingly, L2 eligibility interfaces 550, 556 may be operable to receive an indication from each such L2 component as to whether the L2 component is currently eligible to transmit a packet. Such indication may be transmitted, for example, by a component such as eligibility reporter 390 of shaper 300.

L1 eligibility interfaces 560, 564 may each include hardware and/or executable instructions on a machine-readable storage medium configured to communicate with L1 components such as, for example, one or more of L1 shapers 140, 144. Accordingly, L1 eligibility interfaces 560, 564 may be operable to receive an indication from each such L1 component as to whether the L1 component is currently eligible to transmit a packet. Such indication may be transmitted, for example, by a component such as eligibility reporter 490 of shaper 400.

Highest eligible priority calculator 570 may include hardware and/or executable instructions on a machine-readable storage medium configured to determine which L1 components currently offer a packet with the highest priority. Accordingly, for each L2 component associated with shaper 500, highest eligible priority calculator 570 may retrieve priority information via L2 priority interfaces 540, 546 and eligibility information via L2 eligibility interfaces 550, 556 and/or L1 eligibility interfaces 560, 564. Highest eligible priority calculator 570 may then determine, for those associated L1 devices currently eligible to transmit a packet, the highest priority packet available. Highest eligible priority calculator 570 may then indicate to packet transmitter 520 which L1 components offer a packet having the highest eligible priority. In various alternative embodiments wherein eligibility is not separately reported, highest eligible priority calculator 570 may simply determine the highest reported priority and L2 eligibility interfaces 550, 556 and/or L1 eligibility interfaces 560, 564 may not be present.

Figure 6:
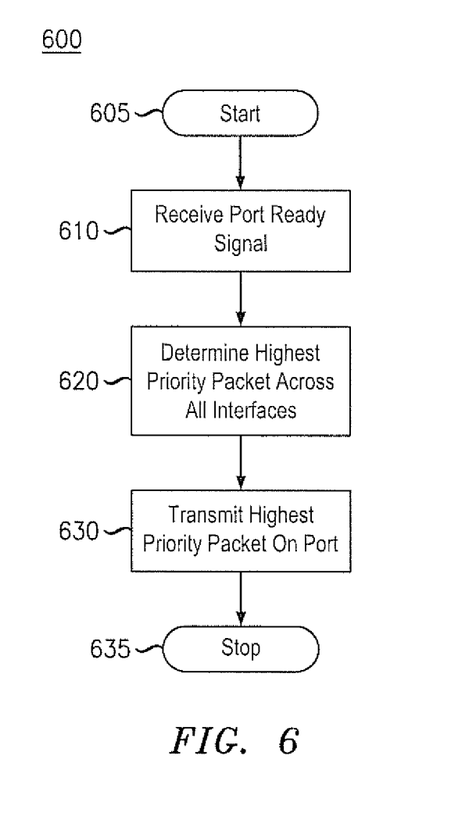
FIG. 6 illustrates an exemplary method for transmitting a packet.

FIG. 6 illustrates an exemplary method 600 for transmitting a packet. Exemplary method 600 may be performed, for example, by the components of network node 100. Method 600 may begin in step 605 and proceed to step 610, where network node 100 may determine that an outgoing port is ready to receive a packet. For example, port 0 160 may transmit a signal to level 0 shaper 150.

Next, in step 620, network node 100 may determine the highest priority packet available for transmission across all incoming interfaces. For example, each L2 component 130, 132, 134, 136 may calculate a highest available priority and send the value to level 0 shaper 150. Level 0 shaper 150 may then select the highest priority of those priorities reported for transmission. In various embodiments wherein various components perform rate shaping and report eligibility, as described in detail above, node 100 may only select a packet for transmission from those packets that are eligible for transmission. Thus, the packet transmitted may be a packet having the highest priority of the set of eligible packets across all interfaces.

Once the highest priority packet is identified, node 100 transmits the packet to the readied port in step 630. In various embodiments, step 630 may include enqueueing the packet on an outgoing buffer of the port and/or presently transmitting the packet via the port to another network node. Method 600 may then proceed to end in step 635.

Figure 7:
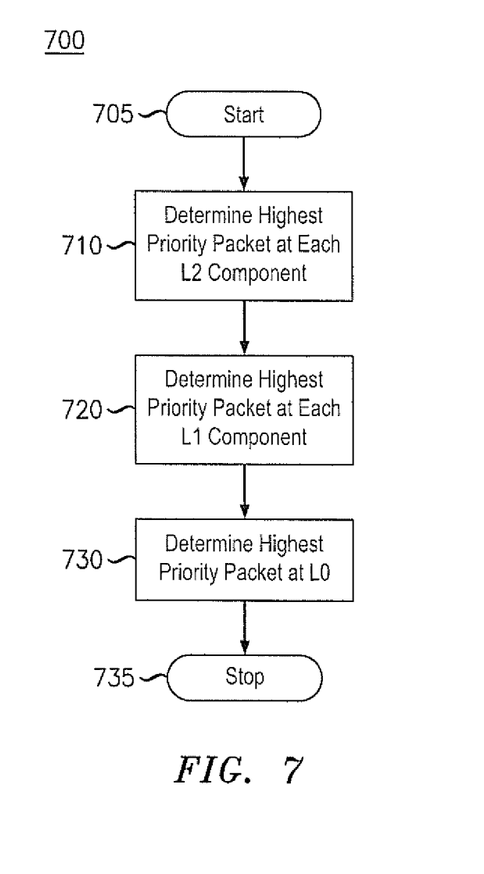
FIG. 7 illustrates an exemplary method for determining a highest priority packet.

FIG. 7 illustrates an exemplary method 700 for determining a highest priority packet. Method 700 may correspond to step 620 of method 600. Method 700 may begin in step 705 and proceed to step 710 where each L2 component determines the highest priority among the packets available to that component. Each L2 component may also report this information to the appropriate L1 and L0 components of node 100. Next, in step 720, each L1 component may use the priorities reported by the associated L2 components to determine which L2 components offer packets carrying the highest available priority. Similarly, in step 730, each L0 component may use the priorities reported by the associated L2 components to determine which L1 components offer packets carrying the highest available priority. Method 700 may then end in step 735.

According to the foregoing, various exemplary embodiments provide a network node that more fully accounts for packet priorities when scheduling packet transmissions. In particular, by sharing a packet priority at all levels of a shaping and/or scheduling hierarchy, each component within the node has access to information helpful in selecting an optimum packet for transmission.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a network node having a hierarchical organization for forwarding packets in a computer network, the method comprising:
   determining, by the network node, that a port of the network node is ready to receive a packet;
   identifying a packet having a highest packet priority among a plurality of packets received via a plurality of interfaces, wherein the step of identifying includes, for each of a plurality of components at a first hierarchy level:
      identifying a first level highest priority packet among a plurality of packets available to the component at the first hierarchy level, based on a packet priority associated with each of the plurality of packets available to the component at the first hierarchy level,
      sharing the packet priority of the first level highest priority packet with at least one component at a second hierarchy level; and
   transmitting the packet having the highest priority to the port.

2. The method of claim 1, wherein the plurality of packets is a group of all packets identified as eligible for transmission by at least a first plurality of traffic shaping components.

3. The method of claim 1, wherein each packet priority of the plurality of packets is determined based on at least one field carried by the packet.

4. The method of claim 1, wherein the plurality of packets are stored among a plurality of queues, the method further comprising:
   determining a status for a queue holding a packet of the plurality of packets;
   determining a packet priority for the packet based on the status of the queue.

5. The method of claim 4, wherein the status is one of committed information rate status and excess information rate status.

6. A network node for forwarding packets, the network node comprising:
   a transmission port for transmitting packets;
   a plurality of interfaces for receiving packets;
   a plurality of queues for storing packets received over the plurality of interfaces, wherein a packet priority is associated with each packet; and
   a plurality of first level shapers that are each associated with a subset of the plurality of queues, wherein each first level shaper:
      identifies a packet having a first level highest packet priority of all packets available for transmission from the subset of the plurality of queues, and
      shares the first level highest packet priority with at least one other component;
   a second level shaper that:
      receives an indication that the transmission port is ready to receive a packet,
      receives at least one first level highest packet priority shared by at least one of the plurality of first level shapers;
      identifies an available packet associated a highest packet priority based on the at least one first level highest packet priority, and
      transmits the available packet having the highest packet priority to the transmission port.

7. The network node of claim 6, wherein the available packet associated with the highest packet priority is selected from a group of packets identified as eligible for transmission by at least a first plurality of shapers.

8. The network node of claim 6, wherein each packet priority is determined based on at least one field carried by the associated packet.

9. The network node of claim 6, wherein
each queue of the plurality of queues comprises an activity monitor that determines a status for the queue based on observed activity; and
the packet priority for each packet is based on the status of the queue that stores the packet.

10. The network node of claim 9, wherein the status is one of committed information rate status and excess information rate status.

11. The network node of claim 6, further comprising:
a third level shaper associated with at least one first level shaper;
wherein the first level shaper shares the first level highest packet priority with at least one of the third level shaper and the second level shaper.

12. A non-transitory machine-readable storage medium encoded with instructions for execution by a network node having a hierarchical organization for forwarding packets in a computer network, the machine-readable storage medium comprising:
instructions for determining, by the network node, that a port of the network node is ready to receive a packet;
instructions for identifying a packet having a highest packet priority among a plurality of packets received via a plurality of interfaces wherein the instructions for identifying include instructions for, for each of a plurality of components at a first hierarchy level:
identifying a first level highest priority packet among a plurality of packets available to the component at the first hierarchy level, based on a packet priority associated with each of the plurality of packets available to the component at the first hierarchy level,
sharing the packet priority of the first level highest priority packet with at least one component at a second hierarchy level; and
instructions for transmitting the packet having the highest priority over the port.

13. The non-transitory machine-readable storage medium of claim 12, wherein the plurality of packets is a group of all packets identified as eligible for transmission by at least a first plurality of traffic shaping components.

14. The non-transitory machine-readable storage medium of claim 12, wherein each packet priority of the plurality of packets is determined based on at least one field carried by the packet.

15. The non-transitory machine-readable storage medium of claim 12, wherein the plurality of packets are stored among a plurality of queues, the machine-readable storage medium further comprising:
instructions for determining a status for a queue holding a packet of the plurality of packets;
instructions for determining a packet priority for the packet based on the status of the queue.

16. The non-transitory machine-readable storage medium of claim 15, wherein the status is one of committed information rate status and excess information rate status.

17. A method performed by a packet processor having a hierarchical organization for forwarding packets in a computer network, the method comprising:
determining, by the packet processor, that the packet processor should transmit a packet;
identifying a packet having a highest packet priority among a plurality of packets received from a plurality of sources, wherein the step of identifying includes, for each of a plurality of components at a first hierarchy level:
identifying a first level highest priority packet among a plurality of packets available to the component at the first hierarchy level, based on a packet priority associated with each of the plurality of packets available to the component at the first hierarchy level,
sharing the packet priority of the first level highest priority packet with at least one component at a second hierarchy level; and
transmitting the packet having the highest priority.

18. The method of claim 17, wherein the plurality of packets is a group of all packets identified as eligible for transmission by at least a first plurality of traffic shaping components.

19. The method of claim 17, wherein each packet priority of the plurality of packets is determined based on at least one field carried by the packet.

20. The method of claim 17, wherein the plurality of packets are stored among a plurality of queues, the method further comprising:
determining a status for a queue holding a packet of the plurality of packets;
determining a packet priority for the packet based on the status of the queue.

21. The method of claim 20, wherein the status is one of committed information rate status and excess information rate status.

22. A packet processor for forwarding packets, the network node comprising:
a plurality of queues for storing received packets, wherein a packet priority is associated with each packet; and
a plurality of first level shapers that are each associated with a subset of the plurality of queues, wherein each first level shaper:
identifies a packet having a first level highest packet priority of all packets available for transmission from the subset of the plurality of queues, and
shares the first level highest packet priority with at least one other component;
a second level shaper that:
determines that the packet processor should transmit a packet,
receives at least one first level highest packet priority shared by at least one of the plurality of first level shapers;
identifies an available packet associated a highest packet priority based on the at least one first level highest packet priority, and
transmits the available packet having the highest packet priority.

23. The packet processor of claim 22, wherein the available packet associated with the highest packet priority is selected from a group of packets identified as eligible for transmission by at least a first plurality of shapers.

24. The packet processor of claim 22, wherein each packet priority is determined based on at least one field carried by the associated packet.

25. The packet processor of claim 22, wherein
each queue of the plurality of queues comprises an activity monitor that determines a status for the queue based on observed activity; and
the packet priority for each packet is based on the status of the queue that stores the packet.

26. The packet processor of claim 25, wherein the status is one of committed information rate status and excess information rate status.

27. The packet processor of claim 22, further comprising:
a third level shaper associated with at least one first level shaper;
wherein the first level shaper shares the first level highest packet priority with at least one of the third level shaper and the second level shaper.

\* \* \* \* \*